US008819200B2

(12) United States Patent
Johnson

(10) Patent No.: US 8,819,200 B2
(45) Date of Patent: Aug. 26, 2014

(54) AUTOMATED CLUSTER NODE CONFIGURATION

(75) Inventor: Jarrod B. Johnson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1771 days.

(21) Appl. No.: 11/782,773

(22) Filed: Jul. 25, 2007

(65) Prior Publication Data
US 2009/0031012 A1 Jan. 29, 2009

(51) Int. Cl.
*G06F 15/16* (2006.01)
*H04L 12/66* (2006.01)

(52) U.S. Cl.
CPC ................................ *H04L 12/66* (2013.01)
USPC ........... 709/222; 709/220; 709/221; 709/225; 709/228

(58) Field of Classification Search
USPC .................................. 709/220–229; 370/389
See application file for complete search history.

(56) References Cited

U.S. PATENT DOCUMENTS

| | | | | |
|---|---|---|---|---|
| 5,798,706 A | | 8/1998 | Kraemer et al. | |
| 5,805,801 A | | 9/1998 | Holloway et al. | |
| 6,009,474 A | * | 12/1999 | Lu et al. | 709/245 |
| 6,314,520 B1 | | 11/2001 | Schell et al. | |
| 6,522,654 B1 | * | 2/2003 | Small | 370/400 |
| 6,556,541 B1 | * | 4/2003 | Bare | 370/235 |
| 6,697,360 B1 | * | 2/2004 | Gai et al. | 370/389 |
| 6,732,186 B1 | * | 5/2004 | Hebert | 709/239 |
| 6,982,953 B1 | * | 1/2006 | Swales | 370/218 |
| 7,096,257 B2 | * | 8/2006 | Trisno et al. | 709/220 |
| 7,099,338 B1 | * | 8/2006 | Lee | 370/401 |
| 7,103,664 B1 | | 9/2006 | Novaes et al. | |
| 7,130,995 B2 | | 10/2006 | Chu et al. | |
| 7,318,101 B2 | * | 1/2008 | Droms | 709/229 |
| 7,345,991 B1 | * | 3/2008 | Shabtay et al. | 370/221 |
| 7,376,724 B2 | * | 5/2008 | Goyal et al. | 709/223 |
| 7,447,223 B2 | * | 11/2008 | Wakumoto et al. | 370/406 |
| 7,472,179 B2 | * | 12/2008 | Tarui et al. | 709/223 |
| 7,493,612 B2 | * | 2/2009 | Tzeng | 717/173 |
| 7,529,815 B2 | * | 5/2009 | Droms | 709/220 |
| 7,743,094 B2 | * | 6/2010 | Metke et al. | 709/203 |

(Continued)

FOREIGN PATENT DOCUMENTS

WO 02078260 A1 10/2002

OTHER PUBLICATIONS

R. Droms: Dynamic Host Configuration Protocol, 1997, RFC2131; http://www.faqs.org/rfcs/rfc2131.html.*

(Continued)

*Primary Examiner* — Catherine Thiaw
(74) *Attorney, Agent, or Firm* — Steven M. Greenberg, Esq.; CRGO Law

(57) ABSTRACT

Embodiments of the present invention address deficiencies of the art in respect to cluster node configuration and provide a novel and non-obvious method, system and computer program product for automated cluster node configuration. In one embodiment of the invention, an automated cluster node configuration method can be provided. The method can include assigning an initial IP address to a newly added cluster node in a cluster, identifying a hardware address for the newly added cluster node, locating an association with the hardware address in a switch in the cluster, re-configuring the assignment of the IP address based upon the located association in the switch, and requesting a reboot of the newly added cluster node with the re-configured assignment of the IP address.

15 Claims, 2 Drawing Sheets

(56) References Cited

U.S. PATENT DOCUMENTS

| | | | |
|---|---|---|---|
| 2003/0088650 A1* | 5/2003 | Fassold et al. | 709/220 |
| 2003/0233576 A1* | 12/2003 | Maufer et al. | 713/201 |
| 2005/0055575 A1* | 3/2005 | Evans et al. | 713/201 |
| 2005/0114474 A1* | 5/2005 | Anderson et al. | 709/220 |
| 2005/0188069 A1* | 8/2005 | Mohandas | 709/223 |
| 2006/0015596 A1* | 1/2006 | Mar et al. | 709/222 |
| 2006/0143432 A1* | 6/2006 | Rothman et al. | 713/2 |
| 2007/0002833 A1* | 1/2007 | Bajic | 370/352 |
| 2007/0136575 A1* | 6/2007 | Gutekunst | 713/156 |

OTHER PUBLICATIONS

Manually Provisioning Additional Nodes to Cluster Domains; Tivoli Provisioning Manager, Version 5.1, retrieved on May 28, 2007.
Cluster Domain Node Configuration; Tivoli Provisioning Manager, Version 5.1, retrieved on May 28, 2007.

* cited by examiner

AUTOMATED CLUSTER NODE CONFIGURATION

BACKGROUND OF THE INVENTION

1. Field of the Invention

The present invention relates to high-availability computing and more particularly to cluster node configuration in a high-availability computing architecture.

2. Description of the Related Art

A cluster domain node is an element in a cluster domain. A cluster node can be either a physical element such as a server instance, or a virtual element such as a software module instance. Two or more servers can appear in a peer domain cluster, functioning as master and standby nodes. Similarly, two or more software module instances can execute in a management server domain cluster as redundancy nodes. In either case, the maximum number of cluster domain nodes permitted to run in a cluster domain depends upon the clustering technology used, but can vary significantly from one clustering technology to another, and can range anywhere from two nodes to many thousands of nodes.

After provisioning a new cluster domain node, additional configuration tasks must be performed before the newly provisioned node can be started. For example, configuration tasks can include editing the cluster domain node properties, adding resources to the cluster domain node, grouping resources, and so on. Commercially, provisioning managers can provide a set of logical device operations that can be used to perform cluster domain node configuration tasks including a set of workflows that implement the requisite logical device operations. To support the partial automation of configuration tasks, workflows must implement appropriate logical device operations, and the relevant workflows must be assigned to the appropriate cluster domain nodes. In particular, for cluster domain nodes, the requisite workflows must be assigned for adding and removing cluster domain nodes, creating resource groups, and starting and stopping cluster domain nodes.

Generally, provisioning tools provide access through an integrated user interface to manually provisioning additional nodes to cluster domains, de-provisioning nodes from cluster domains, editing cluster domain node properties, starting nodes and stopping nodes. In respect particularly to adding nodes, current procedures for adding nodes to a cluster or for replacing nodes in a cluster generally involve a number of manual interactions. For many of the required manual interactions, an administrator must be physically present in proximity to the new or serviced system to perform local tasks. Alternatively, local personnel can perform the manual tasks in proximity to the new or serviced system on behalf of the administrator.

Generally, to activate a new, un-configured node in a cluster, systems management software first must be configured with information descriptive of the un-configured node. Thereafter, the node must be physically installed onto the environment and powered on. After a period of elapsed time, the administrator must manually request a key to be gathered from all nodes in the cluster for the purpose of dynamically assigning Internet protocol (IP) addresses through the dynamic host control protocol (DHCP). In the most typical circumstance, a hardware or adapter address such as a media access control (MAC) address or a universally unique identifier (UUID) can be used as the key for each node. In either case, once the acquisition of the keys can be manually confirmed by an administrator, the administrator must manually reset the system from a location local to the system in that the systems management controller is not yet configured. The newly added node then can be booted into the environment where the systems management controller can be configured, albeit remotely.

BRIEF SUMMARY OF THE INVENTION

Embodiments of the present invention address deficiencies of the art in respect to cluster node configuration and provide a novel and non-obvious method, system and computer program product for automated cluster node configuration. In one embodiment of the invention, an automated cluster node configuration method can be provided. The method can include assigning an initial IP address to a newly added cluster node in a cluster, identifying a hardware address for the newly added cluster node, locating an association with the hardware address in a switch in the cluster, re-configuring the assignment of the IP address based upon the located association in the switch, and requesting a reboot of the newly added cluster node with the re-configured assignment of the IP address.

In one aspect of the embodiment, identifying a hardware address for the newly added cluster node can include providing a node bringup image to the newly added cluster node, and forwarding the hardware address from the node bringup image to a node bring up service for use in locating the association in the switch in the cluster. In another aspect of the embodiment, the method further can include configuring a netboot server for distributing a boot image to the newly added cluster node in accordance with the re-configured assignment of the IP address. In yet another aspect of the embodiment, re-configuring the assignment of the IP address based upon the located association in the switch, comprises re-configuring the assignment of the IP address based upon the located association in the switch for each interface associated with the hardware address.

In another embodiment of the invention, a cluster computing data processing system can be provided. The system can include cluster nodes in a cluster and a DHCP server communicatively linked to the cluster and configured to dynamically assign IP addresses to requesting ones of the cluster nodes. The system further can include a management server communicatively linked to the cluster, and a node bringup service coupled to the management server. The node bringup service can include program code enabled identifying a hardware address for a newly added one of the cluster nodes, to locate an association with the hardware address in a switch in the cluster, to re-configure the DHCP server in assigning an IP address to the newly added one of the cluster nodes based upon the located association in the switch, and to request a reboot of the newly added one of the cluster nodes with a re-configured assignment of the IP address.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for automated cluster node configuration. In accordance with an embodiment of the present invention, the process of configuring a newly added cluster node to a cluster can be automated. In this regard, a MAC address and corresponding interface can be provided to a node bringup service in a management server for the cluster. The node bringup service can search switches in the cluster to identify a switch in which a port has been assigned to the MAC address. Thereafter, the node bringup service can reconfigure the DHCP server to account for the identified switch and port, and also the node bringup service can configure the netboot server for the cluster to provide a suitable boot image to the newly added cluster node according to the identified switch and port. Finally, the newly added cluster node can be rebooted into the cluster.

Figure 1:
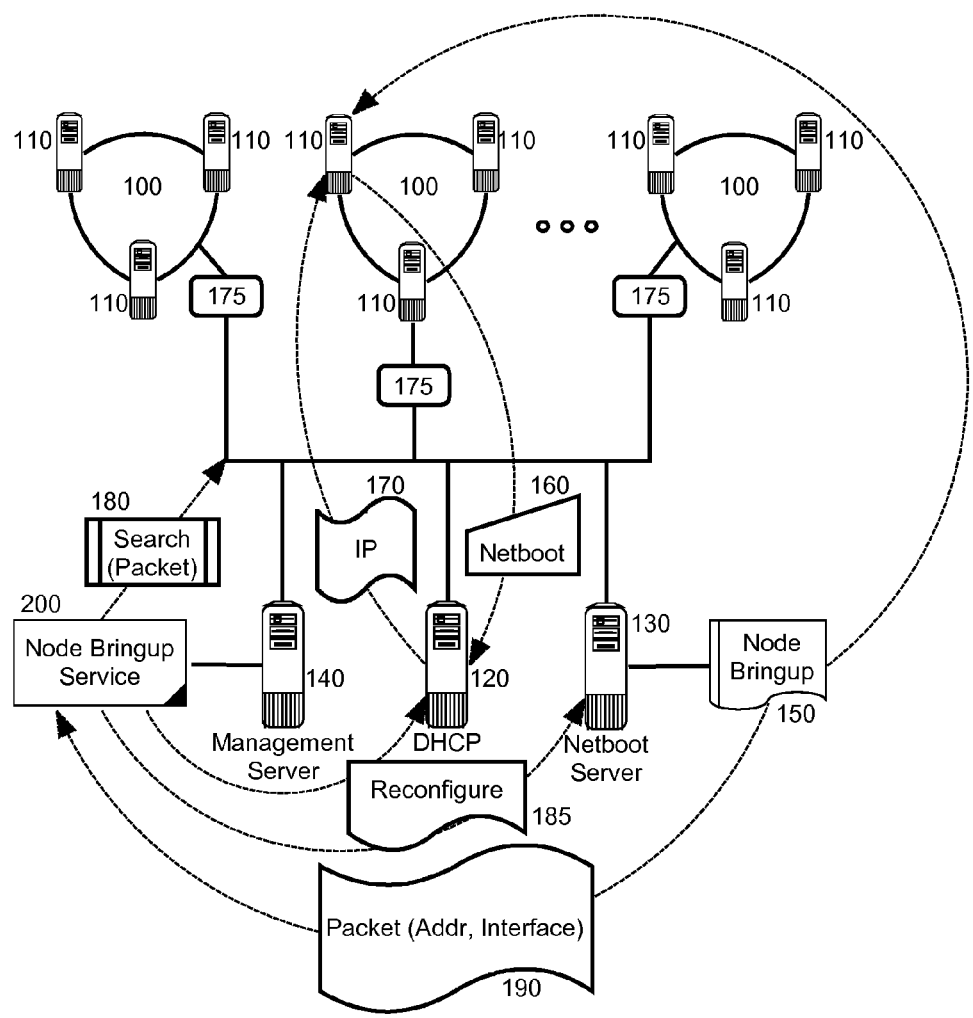
FIG. 1 is a schematic illustration of a clustered computing data processing system configured for automated cluster node configuration; and, FIG. 2 is a flow chart illustrating a process for automated cluster node configuration in a clustered computing environment.

In illustration, FIG. 1 is a schematic illustration of a clustered computing data processing system configured for automated cluster node configuration. The system can include one or more computing clusters 100 of individual cluster nodes 110 to provide a clustered computing environment. The clusters 100 can be communicatively coupled to one another over a computer communications network backbone via switches 175. A DHCP server 120 can be coupled to the backbone and enabled to provide dynamic IP addresses to requesting ones of the cluster nodes 110 in the different clusters 100. Additionally, a netboot server 130 can be provided to facilitate the net booting of requesting ones of the cluster nodes 110 by serving boot images to individual ones of the cluster nodes 110 on demand.

A management server 140 further can be coupled to the backbone and enabled to provide a management interface to the different clusters 100 of the clustered computing environment. The management server 140 can include a process to read configuration files for managed ones of the clusters 100 and to distribute cluster configuration information to all requesting cluster nodes 110 in the different clusters 100. The process also can maintain a log of activities for the clusters 100. Yet further, management clients can connect to the process of the management server 140 in order to check the status of the clusters 100. Finally, a node bringup service 200 can be coupled to the management server 140.

The node bringup service 200 can include program code enabled to process a packet 190 of one or more MAC addresses and corresponding interfaces for a newly added one of the cluster nodes 110 and to use the packet 190 to locate the newly added one of the cluster nodes 110 in association with a coupled switch 175. Specifically, a node bringup image 150 can be imparted upon the newly added one of the cluster nodes 110 during power on of the newly added one of the cluster nodes 110. The node bringup image 150 can be configured to cause the newly added one of the cluster nodes 110 to forward a netboot request 160 to the DHCP server 120 which can respond with a dynamically assigned IP address 170. The node bringup image 150 further can be configured then to provide a packet 190 to the node bringup service 200 including payload enumerating each MAC address associated with the newly added one of the cluster nodes 110 and corresponding network protocol interfaces.

The program code of the node bringup service 200, upon receiving the packet 190, can send a search request 180 to each switch 175 using simple network management protocol (SNMP), for example, to locate an association between a port for the switch 175 and a MAC address in the payload of the packet 190. Upon locating the association, the configuration of the newly added one of the cluster nodes 110 corresponding to the located association between MAC address and port can be retrieved and applied as a reconfiguration 185 of the DHCP server 120 assigned IP address 170 and the netboot server 130 in delivering a boot image for the newly added one of the cluster nodes 110. In this way, the newly added one of the cluster of nodes 110 can be configured in an automated fashion without requiring manual intervention by a remotely disposed administrator.

Optionally, a systems management controller can provide for automated configuration of a newly added one of the cluster nodes 110. In this regard, the DHCP server 120 upon receipt of a netboot request 160 can provide an IP address 170 and can determine from a client identifier within the netboot request 160 whether or not the requester is a systems management controller. If so, the DHCP server 120 can directly request of the systems management controller to locate a MAC address association for a newly added one of the cluster nodes 110. Upon locating the association, the configuration of the newly added one of the cluster nodes 110 corresponding to the located association between MAC address and port can be retrieved and applied as a reconfiguration 185 of the DHCP server 120 assigned IP address 170 and the netboot server 130 in delivering a boot image for the newly added one of the cluster nodes 110.

Figure 2:
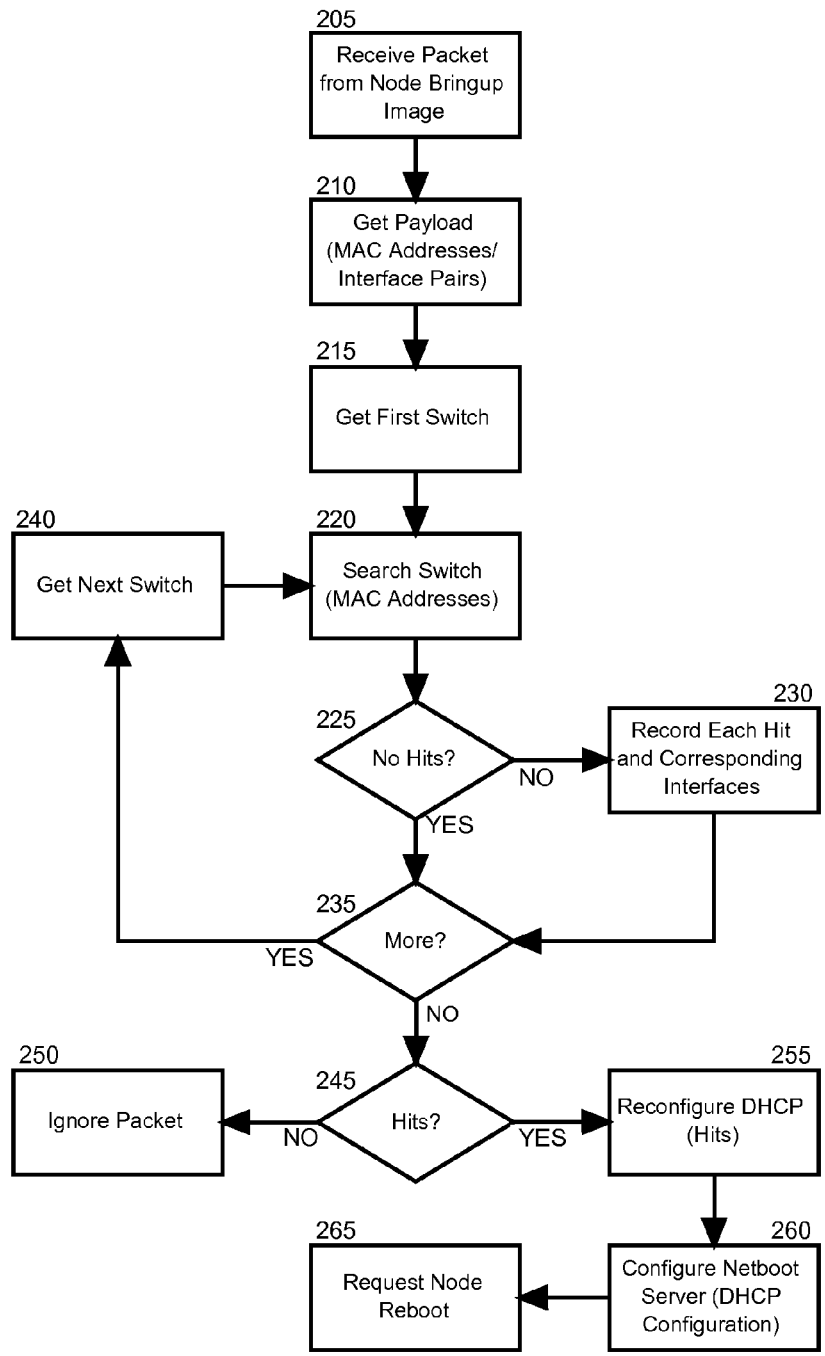

In further illustration, FIG. 2 is a flow chart illustrating a process for automated cluster node configuration in a clustered computing environment. The process can begin in block 205 with the receipt of a packet with payload from a node bringup image in a newly added cluster node. In block 210, the payload can be retrieved from the packet and different pairs of MAC address interface pairs can be extracted. In block 215, a first switch in the cluster can be identified and in block 220 a management request can be forwarded to the first switch in the cluster to locate an association between any of the MAC addresses and any ports known to the switch. Thereafter, in decision block 225 it can be determined whether or not an association exists in the switch for any of the MAC addresses and any ports.

In decision block 225, if it is determined that an association exists in the switch for any of the MAC addresses and any ports, in block 230, a hit can be stored for each associated MAC address and every interface paired with the MAC address in the payload. In decision block 235, if additional switches remain to be queried, in block 240, a next switch in the cluster can be selected and the process can repeat through block 220. In decision block 235, when no switches remain to be queried, in decision block 245 it can be determined whether or not any MAC addresses had been located in any of the switches in association with any of the ports known to one or more of the switches. If not, in block 250 the packet can be ignored. Alternatively, the packet can be logged in the event that a retry can be expected for configuring the newly added cluster node.

In decision block 245, if it is determined that one or more MAC addresses had been located in any of the switches in association with any of the ports known to one or more of the switches, in block 255, the entry in the DHCP server for the newly added cluster node can be reconfigured to reflect the known location and corresponding interfaces of the newly added node in association with a switch in which a MAC address for the newly added node had been identified. Also, in block 260, the netboot server can be configured to distribute an appropriate boot image to the newly added cluster node based upon the location of the newly added cluster node in the cluster. Finally, in block 265 the newly added cluster node can be issued a reboot request in order to receive a new IP address assignment by the DHCP server in its new configuration and a new boot image can be distributed to the newly added cluster node by the netboot server according to its new configuration.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain, store or communicate the program for use by or in connection with the instruction execution system, apparatus, or device. The medium can be an electronic, magnetic, optical, electromagnetic, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An automated cluster node configuration method comprising:
    assigning an initial Internet protocol (IP) address to a newly added cluster node in a cluster;
    identifying a hardware address for the newly added cluster node;
    locating an association with the hardware address in a switch in the cluster;
    re-configuring the assignment of the IP address based upon the located association in the switch; and,
    requesting a reboot of the newly added cluster node with the re-configured assignment of the IP address.

2. The method of claim 1, wherein identifying a hardware address for the newly added cluster node, comprises:
    providing a node bringup image to the newly added cluster node; and,
    forwarding the hardware address from the node bringup image to a node bring up service for use in locating the association in the switch in the cluster.

3. The method of claim 1, further comprising configuring a netboot server for distributing a boot image to the newly added cluster node in accordance with the re-configured assignment of the IP address.

4. The method of claim 1, wherein re-configuring the assignment of the IP address based upon the located association in the switch, comprises re-configuring the assignment of the IP address based upon the located association in the switch for each interface associated with the hardware address.

5. The method of claim 1, further comprising:
    failing to locate an association with the hardware address in a switch in the cluster; and,
    ignoring the newly added cluster node.

6. The method of claim 5, further comprising logging the failure to locate the association with the hardware address in the switch in the cluster.

7. A cluster computing data processing system comprising:
    a plurality of cluster nodes in a cluster;
    a dynamic host configuration protocol (DHCP) server communicatively linked to the cluster and configured to dynamically assign Internet protocol (IP) addresses to requesting ones of the cluster nodes;
    a management server communicatively linked to the cluster; and,
    a node bringup service coupled to the management server, the node bringup service comprising program code enabled identifying a hardware address for a newly added one of the cluster nodes, to locate an association with the hardware address in a switch in the cluster, to re-configured the DHCP server in assigning an IP address to the newly added one of the cluster nodes based upon the located association in the switch, and to request a reboot of the newly added one of the cluster nodes with a re-configured assignment of the IP address.

8. The system of claim 7, wherein the hardware address is a media access control (MAC) address.

9. The system of claim 7, further comprising a netboot server communicatively linked to the cluster and configured to impart a node bringup image on the newly added one of the cluster nodes and to subsequently impart a boot image to the newly added one of the cluster nodes upon reboot of the newly added one of the cluster nodes.

10. A computer program product comprising a computer readable usable storage device embodying computer usable program code for automated cluster node configuration, the computer program product comprising:
    computer usable program code for assigning an initial Internet protocol (IP) address to a newly added cluster node in a cluster;
    computer usable program code for identifying a hardware address for the newly added cluster node;
    computer usable program code for locating an association with the hardware address in a switch in the cluster;
    computer usable program code for re-configuring the assignment of the IP address based upon the located association in the switch; and, computer usable program code for requesting a reboot of the newly added cluster node with the re-configured assignment of the IP address.

11. The computer program product of claim 10, wherein the computer usable program code for identifying a hardware address for the newly added cluster node, comprises:

computer usable program code for providing a node bringup image to the newly added cluster node; and, computer usable program code for forwarding the hardware address from the node bringup image to a node bring up service for use in locating the association in the switch in the cluster.

12. The computer program product of claim 10, further comprising computer usable program code for configuring a netboot server for distributing a boot image to the newly added cluster node in accordance with the re-configured assignment of the IP address.

13. The computer program product of claim 10, wherein the computer usable program code for re-configuring the assignment of the IP address based upon the located association in the switch, comprises computer usable program code for re-configuring the assignment of the IP address based upon the located association in the switch for each interface associated with the hardware address.

14. The computer program product of claim 10, further comprising:

computer usable program code for failing to locate an association with the hardware address in a switch in the cluster; and, computer usable program code for ignoring the newly added cluster node.

15. The computer program product of claim 14, further comprising logging the failure to locate the association with the hardware address in the switch in the cluster.

* * * * *